April 2, 1963 R. P. DUNMIRE 3,084,066
COATED METAL ARTICLE AND METHOD OF PRODUCING
Filed Nov. 3, 1959
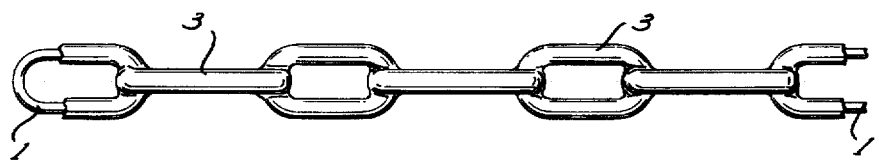
Fig. 1
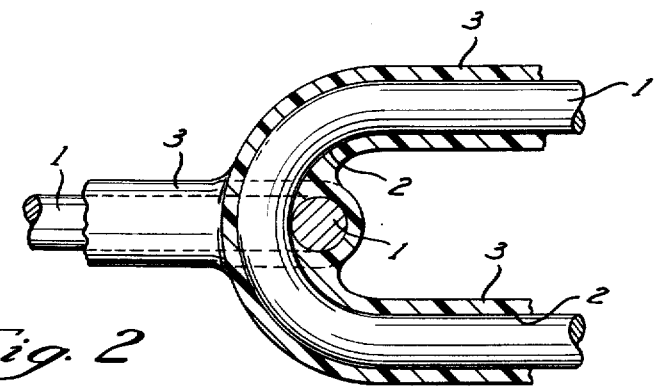
Fig. 2
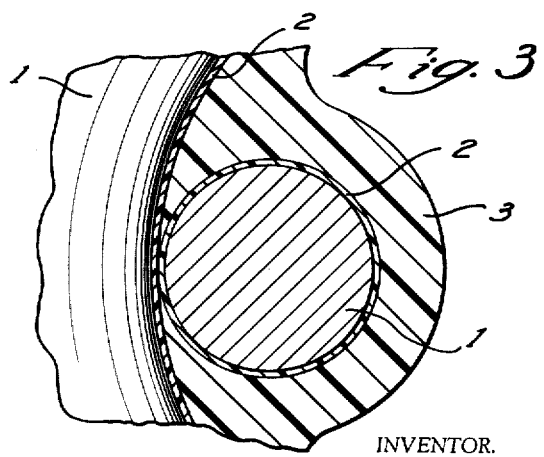
Fig. 3
Fig. 4
INVENTOR.
RUSSELL P. DUNMIRE
BY
WATTS & EDGERTON
ATTORNEYS

United States Patent Office 3,084,066
Patented Apr. 2, 1963

3,084,066
COATED METAL ARTICLE AND METHOD
OF PRODUCING
Russell P. Dunmire, 29550 Pike Drive,
Chagrin Falls, Ohio
Filed Nov. 3, 1959, Ser. No. 850,702
2 Claims. (Cl. 117—75)

This invention relates to the coating art and is particularly concerned with new coated articles and a new method of producing such articles.

Heretofore, efforts have been made to protect metal articles against corrosion, chemical action, impact blows, mechanical damage and the like by coating them with various materials. Coatings for these purposes have been made from metals such as tin and zinc, paint, bituminous material, natural rubber and various plastics such as synthetic rubber, polyethylene, polyvinyl chloride, and other similar materials.

All these coatings initially adhere tightly to the metal surfaces but are not capable of withstanding satisfactorily the use and abuse to which the articles are often subjected. Abrasion and friction wear away most of these coatings, impact blows and other mechanically applied forces frequently cause the coatings to chip or flake off, and bending of the article often tears or pulls the plastic coating loose from the metal. Differential expansion and contraction of the coatings and the metal articles often result in breaking the adherence of one to the other and resultant removal of the coating wholly or in part. All such actions expose the metal surface and result in loss of the desired protection against damage to the metal of the article.

There are many articles which should be protected by satisfactory coatings. Articles having relatively movable interengaging metal parts are especially in need of such coatings. Illustrative of such articles are link chains for various uses, such as marine uses, industrial uses, children's playground equipment, dog leashes and the like, interlocked and/or woven fencing and the like. In all these articles, the metal parts tend to wear and abrade engaged metal parts and destroy coatings initially applied to the engaged surfaces, and repeated relative movements of the metal parts cause the coating to break and chip off and, in the case of rubber or plastic coatings, to crack or tear. While many workers in the art have made various proposals for solving this long standing problem, no one, to my knowledge, has satisfactorily solved it.

The present article invention aims to solve that problem and achieves that aim by providing metal articles, and particularly those having relatively movable interconnected metal parts lying adjacent to or in contact with one another, with a coating which completely envelopes the article, seals in and retains a lubricant in contact with the metal surfaces, and protects all the parts from harmful influences, and which will not tear, crack, flake, chip off or be mechanically injured when the metal parts move relative to one another or the metal coating expands or contracts relatively. The present invention also contemplates a new method of producing articles embodying the article invention.

The present invention will be better understood by those skilled in the art from the drawing which accompanies and forms a part of this specification and in which:

FIGURE 1 shows part of a coated link chain embodying the present invention;

FIGURE 2 is a fragmentary, partly sectional view of two links of the chain of FIGURE 1;

FIGURE 3 is a fragmentary, partly sectional, close up view of the connecting portions of the two links of FIGURE 2, and FIGURE 4 is a flow chart showing typical steps of the present process.

In FIGURES 1, 2 and 3 is shown a fragment of a chain consisting of links 1 made of steel wire. A thin film 2 of suitable material (shown in exaggerated thickness) completely covers all the surfaces of links 1. A coating of plastic material 3 covers the film 2, extends continuously overall of the links except the interengaging surfaces of the links and seals in and retains the material of film 2.

It is important that the coating 3 should not adhere to the metal parts 1 and to that end the film 2 should be capable of adhering to the surfaces of parts 1 but not to coating 3, and of preventing contact or adhesion of coating 3 with the surfaces of parts 1. Materials which are suitable for use as film 2 include lubricants such as thin bearing oils, parting compounds, flake materials such as graphite in suitable liquids and preferably a silicone compound in fluid or thin grease-like form. Extremely fine graphite may be added to these silicone compounds. The material selected for film 2 should be able to withstand the temperatures to which it will be subjected when the coating 3 is being formed thereover as well as in the expected use of the article. The use of these various materials of a lubricating nature minimizes wear of the metal parts against one another and prevents adherence of the coating 3 to the metal parts or article. When lubricating flakes or solids are added to a liquid or grease they provide a safety factor in case some of the parting properties of the liquid or grease of film 2 is lost for any reason. When a film-forming material of the composition and properties just described is used, it definitely insures that the coating will not adhere to any of the metal parts and it tends to prevent the formation and/or adhesion of the coating to surfaces of the metal parts which are to be in direct contact with one another when the article is in use, for example, in a chain or interlocked fencing where the links or wires engage and move relative to one another when subjected to tension or deformation.

The coating 3 may consist of various materials, preferably elastomers, such as natural or synthetic rubbers, synthetic resins, plastisols, organosols, polymeric compounds and the like. Such a coating should have a high degree of elasticity and flexibility so that it may move in any direction repeatedly and without tearing, cracking or breaking, and should be capable of slipping freely on the film 2 as well as equalizing and distributing in the coating stresses and/or strains applied locally to the coating. This coating should not adhere to the film but should slip on the film and metal parts much like a glove on a person's hand.

A series of steps by which articles embodying the present invention may be made is shown in FIGURE 4, which is more or less self-explanatory by reason of the legends appearing thereon. The material for film 2 when in liquid form may be applied to the metal parts in any suitable manner, for example, as by spraying it onto the metal parts. After the film 2 has been formed, coating 3 may be formed in any one of several different manners, for example, by dipping the film covered article into the coating material while in a fluid condition, or by heating the article and blowing the coating material in a powdered state onto the article, or spraying it in liquid form, onto the heated article, for example, by spraying it on electrostatically. The coating 3 may also be extruded over the metal article, if desired. In the event heat is required to complete the formation on the coating 3, the article may be heated after application thereto of the material of coating 3, and the article is cooled after the coating 3 has set or after fusion or vulcanization has taken place. When the coating 3 is made by the extrusion method, subsequent heat is not required to cause it to set.

The coating 3 may be given any desired color by the addition of suitable coloring materials thereto. The coating may be made electro-conductive by the addition thereto of metallic particles, such as carbon black, which also gives better weathering characteristics and chemical properties.

The coating may be made of any desired thickness, within practical limits, by varying the viscosities of the fluids used for coating, successive numbers of layers of the coating 3 and may also be applied, and different materials may be employed in the several layers in laminated forms with each of such layers having different properties and/or characteristics from the other layers.

The coating 3 may also contain electro-magnetic materials such as metallic particles or ceramic compounds either pre-magnetized or capable of being magnetized.

The coating 3 may also be fluorescent or phosphorescent by including the required materials in the coating compounds.

Strengthening or reinforcing materials may be incorporated in the coating 3. For example, natural or synthetic fibers may be distributed therein, but the fibers to be incorporated in the coating should be selected with the service conditions to be encountered in mind. Where low temperatures and non-corrosive conditions are to be met, natural fibers such as cotton and various synthetic fibers of nylon and other synthetic materials may be used where their properties permit. For higher temperature conditions asbestos fibers may be used.

Products embodying the present invention are characterized in that the metal parts are more or less permanently protected against corrosion, the flexible, resilient and/or elastic coating covering the parts does not adhere to them and may move with them and flex and bend as they move without tearing and the interengaging metal surfaces are permanently lubricated. The coating, being resilient and loose on the parts of the article, is not readily damaged or cut by impact and hence has a long life traceable to that characteristic. Since the coating completely envelops the metal article and the materials of film 2, and tends to maintain itself against cracking, tearing, and the like, the coating serves to retain the film material throughout long continued use.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:
1. A new article of commerce comprising:
   (a) a metal article composed of a plurality of relatively movable elements connected together and disposed closely adjacent to one another,
   (b) a film of lubricating material engaging and covering the surfaces of said elements,
   (c) and a flexible coating of silicone material enveloping said elements and film to protect the elements when in use,
   (d) said coating being non-adherent to the film, resistant to chemical action, corrosion, abrasion and friction and being freely movable relative to said elements and sufficiently elastic and flexible to move in any direction relative to the elements repeatedly and without tearing, cracking, or breaking and of equalizing and distributing within itself stress and strains applied locally to the coating.

2. The combination of elements set forth in claim 1 in which the lubricating material is composed of one or more materials selected from the group consisting of thin bearing oils, graphite and a thin grease-like silicone compound.

References Cited in the file of this patent

UNITED STATES PATENTS

| | | |
|---|---|---|
| 1,845,041 | Boring | Feb. 16, 1932 |
| 2,099,103 | Cox | Nov. 16, 1937 |
| 2,110,226 | Hill | Mar. 8, 1938 |
| 2,394,101 | Phillips et al. | Feb. 5, 1946 |
| 2,561,487 | Bailhe | July 24, 1951 |
| 2,608,129 | Varian | Aug. 26, 1952 |
| 2,703,768 | Hall | Mar. 8, 1955 |
| 2,789,933 | Bargmeyer | Apr. 23, 1957 |
| 2,795,038 | Marting | June 11, 1957 |
| 2,861,352 | Fender | Nov. 25, 1958 |
| 3,002,409 | Jones | Oct. 3, 1961 |

UNITED STATES PATENT OFFICE

CERTIFICATE OF CORRECTION

Patent No. 3,084,066                                            April 2, 1963

Russell P. Dunmire

It is hereby certified that error appears in the above numbered patent requiring correction and that the said Letters Patent should read as corrected below.

Column 4, under the heading, "UNITED STATES PATENTS", for 2,608,129" read -- 2,608,529 --.

Signed and sealed this 12th day of November 1963.

(SEAL)
Attest:
ERNEST W. SWIDER                                    EDWIN L. REYNOLDS Attesting Officer                                  Acting Commissioner of Patents